United States Patent
Heckel, Jr. et al.

(10) Patent No.: US 6,557,941 B1
(45) Date of Patent: May 6, 2003

(54) MEMORY SYSTEM FOR SEAT BACK RECLINER

(75) Inventors: Donald T. Heckel, Jr., Westfield, IN (US); Kevin N. Tribbett, Noblesville, IN (US)

(73) Assignee: Porter Engineered Systems, Inc., Westfield, IN (US)

(*) Notice: Subject to any disclaimer, the term of this patent is extended or adjusted under 35 U.S.C. 154(b) by 0 days.

(21) Appl. No.: 09/480,708

(22) Filed: Jan. 7, 2000

(51) Int. Cl.[7] ................................................ B60N 2/02
(52) U.S. Cl. ............................ 297/354.12; 297/378.12; 297/361.1
(58) Field of Search .................. 297/357.12, 361.1, 297/364, 367, 369, 378.12

(56) References Cited

U.S. PATENT DOCUMENTS

| | | |
|---|---|---|
| 3,874,480 A | 4/1975 | Porter et al. |
| 3,887,232 A | 6/1975 | Dinkel |
| 3,953,069 A | 4/1976 | Tamura |
| 4,502,730 A | 3/1985 | Kazaoka et al. |
| 4,577,730 A | 3/1986 | Porter |
| 4,660,886 A | 4/1987 | Terada et al. |
| 5,219,045 A | 6/1993 | Porter et al. |
| 5,597,206 A * | 1/1997 | Ainsworth et al. .... 297/378.12 |
| 5,769,493 A * | 6/1998 | Pejathaya ............ 297/361.1 X |
| 5,794,470 A | 8/1998 | Stringer |
| 5,806,932 A | 9/1998 | Zhuang |
| 5,823,622 A * | 10/1998 | Fisher, IV et al. .. 297/378.12 X |
| 5,871,259 A * | 2/1999 | Gehart ................ 297/361.1 X |
| 5,918,939 A * | 7/1999 | Magadanz ............. 297/378.12 |
| 5,979,986 A * | 11/1999 | Pejathaya ............... 297/369 X |
| 5,984,412 A * | 11/1999 | Magyar ................... 297/367 X |
| 6,017,090 A * | 1/2000 | Bonk ................ 297/378.12 X |
| 6,106,067 A | 8/2000 | Zhuang et al. |

\* cited by examiner

Primary Examiner—Peter M. Cuomo
Assistant Examiner—Stephen Vu
(74) Attorney, Agent, or Firm—Baker & Daniels

(57) ABSTRACT

Three mechanical locks are part of a mechanism for adjusting and dumping a vehicle seat. A master mechanical lock attaches to the seat back. When it is unlocked, depending on the condition of the other locks, one can adjust or dump the seat. A dumping mechanical lock also attaches to the seat back through an intermediary of a slave mechanical lock. When the dumping mechanical lock is unlocked, a connection to the master mechanical lock also opens that lock to allow the seat back to dump. When one unlocks just the master mechanical lock, a connection between that lock and the slave lock unlocks the slave lock. When that lock is unlocked, one can adjust the distance of dumping mechanical lock to the seat back. Because the slave lock remains locked during dumping, the distance between the dumping mechanical lock and the seat back remains constant after dumping. A latch mechanism keeps the dumping lock unlocked until the dumping lock returns to a predetermined position. A connection between the master and dumping locks keeps the master lock unlocked as long as the latch mechanism keeps the dumping lock unlocked.

8 Claims, 4 Drawing Sheets

MEMORY SYSTEM FOR SEAT BACK RECLINER

BACKGROUND OF THE INVENTION

1. Field of the Invention

The present invention relates to a seat recline system that includes memory. Memory is a feature that "remembers" a seat back's adjusted position after the seat has been dumped, i.e. pivoted fully forward.

2. General Background and State of the Art

Almost all seat backs of vehicle front seats are adjustable. Occupants can adjust the incline of those seat backs for their comfort.

Dumping is the forward pivoting of the front seat of a two-door vehicle to allow passengers to enter the rear seat or to allow cargo to be stored behind the front seat. Many seats dump by releasing the seat's adjusting mechanism and then, as a result, lose the previous adjustment. Therefore, returning the dumped seat back to the upright position requires the occupant to readjust the seat back.

U.S. Pat. No. 5,806,932 (1998) (Zhuang) and application Ser. No. 09/230,964, filed Jul. 25, 1997 (Zhuang, Eaton, Lawhead and Parrinello), are examples of earlier seat memory systems. The systems have master and slave units. Each relies on a plate near the pivot point of the seat back. Each plate uses a latch. When the latch is unlatched, the seat back can dump, but when the latch is latched, the entire plate moves for seat back adjustment. A mechanism between the master and slave units coordinates their functions.

Several other devices separate dumping from normal adjustments. Therefore, they maintain their adjustment after dumping. The following U.S. patents teach the concept of separation of dumping from other seat adjustments: Dinkel, U.S. Pat. No. 3,887,232 (1975); Tamura, U.S. Pat. No. 3,593,069 (1976), Kazaoka, U.S. Pat. No. 4,502,730 (1985), and Terada, U.S. Pat. No. 4,660,886 (1987). These devices are quite complex with many cooperating parts. Complexity adds to cost and the chance of failure. Adding more parts also increases the weight of the mechanism, which runs counter to weight reduction strategies favored by vehicle manufacturers.

Many seats use mechanical locks for controlling the great back position. One of the more successful mechanical locks uses a rod moveable longitudinally within a housing. U.S. Pat. No. 3,874,480 (1975) (Porter and Sember), "Friction Brake Mechanism," U.S. Pat. No. 4,577,730 (1986) (Porter), "Mechanical Lock," and U.S. Pat. No. 5,219,045 (1993) (Porter and Babiciuc), "Linear Mechanical Lock with One-Piece Lock Housing," are examples of such locks. The housing attaches to a fixed vehicle part, and the rod attaches to a part that can move. Their attachments can be reversed. A coil or clutch spring, which is fixed relative to the housing, has a normal inside diameter slightly less than the rod's outside diameter. When a release lever acts on the coil spring's free end, the spring unwinds or uncoils slightly. Unwinding increases the spring's inside diameter enough to release the rod. Releasing the spring causes it to grip the rod. These locks can be manufactured at low cost, need little or no maintenance and are reliable.

INVENTION SUMMARY

Disclosing and providing a less complex memory seat adjustment and dumping mechanism is a principal object of the present invention. Another object is to disclose and provide a mechanism that can use reliable, inexpensive mechanical locks but still has memory.

The present invention controls reclining and dumping of a seat back. The mechanism uses three mechanical locks. The first, a master mechanical lock, attaches between the seat frame and the seat back. It comprises a housing and a rod that can move within the housing. The rod's movement pivots the seat back. A locking mechanism within the lock selectively secures or releases the rod. The second mechanical lock is the dumping lock. It also comprises a housing, which attaches to the seat frame. A rod moves within the housing. The third mechanical lock is a slave lock. The housing of the slave lock attaches to the seat back, and the rod that is within the dumping mechanical lock also extends through the housing of this slave lock.

Cables extend between the locks. When the master mechanical lock is opened, the cable also opens the slave mechanical lock. When both locks are open, the rod in the master lock can move within the housing, and the housing of the slave recline lock can move along its rod. When both of those movements can take place, the seat back can pivot and be adjusted.

Another cable connects the dumping mechanical lock with the master mechanical lock. When dumping occurs, the dumping mechanical lock opens, and the cable also causes the master mechanical lock to open. Movement of the rod in the dumping mechanical lock carries along the housing of the slave mechanical lock. The movement of the slave lock, the rod within the dumping mechanical lock and the rod of the master lock allows the seat back to dump. However, the rod does not move within the housing of the slave lock.

The dumping mechanical lock also has a latch mechanism. When the dumping mechanical lock opens, the latch blocks the dumping lock from relocking. However, after the seat back is returned to its upright position, the rod strikes the latch and releases the locking mechanism of the dumping mechanical lock. When the dumping lock relocks, the cable between the dumping lock and the master lock releases so that the master lock can relock also. Accordingly, the rod always has the same locked position within the dumping mechanical lock. During dumping, the slave lock remains locked. Consequently, when the rod is back in its locked position, the slave mechanical lock maintains its adjusted position relative to the rod.

Other objects and advantages of the present invention will be evident from the detailed description of the exemplary embodiment.

DETAILED DESCRIPTION OF THE PREFERRED EMBODIMENTS

Figure 5:
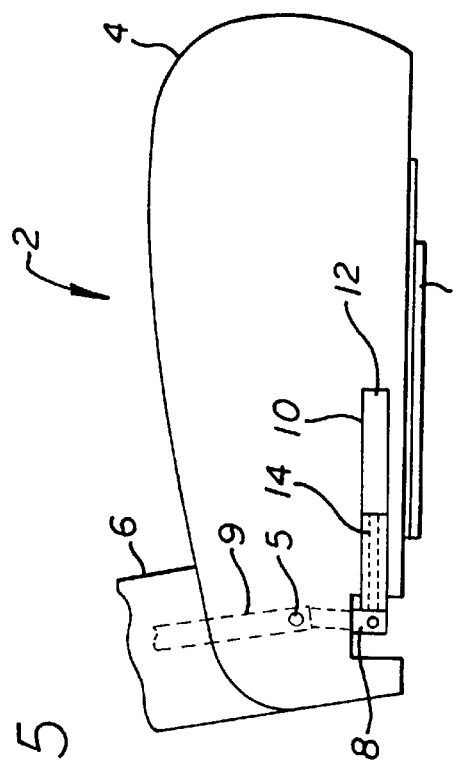
FIG. 5 shows a typical vehicle seat where the memory system of the present invention could mount.

Seat 2 has a seat back 6 and a seating surface 4 (FIG. 5). The seat is representative of vehicle seats in general. The size and spacing of many of the parts controlling the seat depend on the dimensions, positions, weight and other attributes of the seat and car or truck.

The seat mounts to a frame 7. The frame, which is shown schematically, mounts on tracks that are attached to the vehicle floor (not shown). This mounting allows the seat to move forward and backward. The frame also may have structure that allows the seat to move vertically. Some seats also can tilt.

The seat back 6 can pivot clockwise and counterclockwise relative to the seating surface 4. For the description of this invention, seat 2 is a front seat of a two-door vehicle though it also could be any seat that one reclines to enter the seat or to access the storage space directly behind seat 2 in a two-door vehicle. The seat back has a pair of internal frame arms (only a bottom part 8 and part 9 of the remaining frame arm is visible in FIG. 5). These arms normally run along the inside sides of the seat back and are part of the frame of the seat back. The frame arms pivot about coaxial pivots 5 (only one of which is shown schematically in FIG. 5). Horizontal or diagonal braces can connect the frame arms to support the seat back.

When a passenger wants to enter the rear seat directly behind seat 2, someone dumps seat back 6 (i.e., pivots the seat back clockwise in FIG. 5). The seat back frame arms pivot about coaxial pivot points 5. Therefore, as part 8 pivots clockwise (to the left in FIG. 5), the frame arms 9 and the seat back 6 also pivot clockwise (to the right in the figure).

In the prior art, two mechanical locks (FIG. 5 shows only one lock 10) normally attach to respective frame arms to control the pivoting of the seat back. In FIG. 5, the mechanical lock is representational and not shown in detail. However, the lock has a housing 12 and a rod 14 that translates in the housing. In the FIG. 5 arrangement, as the rod translates to the left, out of housing 12, part of the frame arm 8 and 9 and the seat back 6 pivot clockwise. The housing 12 of lock 10 attaches to seat frame 7. Structure on the seat frame and on the housing (neither shown in FIG. 5) secures the housing to the seat frame.

The mechanical lock is mounted horizontally in FIG. 5, but it can mount very differently. For example, it could mount at an angle to horizontal, and it could mount on the rear (left) side in FIG. 5. For some mountings, the rod would move into the housing when the seat back rotates clockwise. Vehicle and seat manufacturers usually specify how the mechanical lock mounts to a seat. The specifications often depend on the seat and vehicle design.

Figure 6:
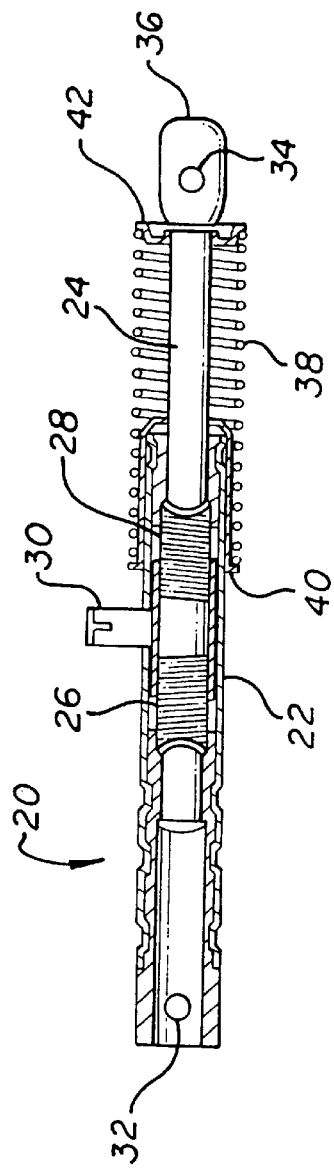
FIG. 6 shows a typical mechanical lock that could be used in the system of the present invention.

FIG. 6 shows a mechanical lock 20 that the present invention could use. The drawing is taken from Stringer, U.S. Pat. No. 5,794,470 (1998). The disclosure is incorporated by reference. It is shown facing in the opposite direction than the lock 10 in FIG. 5. The choice of mechanical locks will depend on their particular application such as the vehicle type, seat and vehicle dimensions, seat construction, and on the forces from which the lock will be loaded during crashes or sudden stops.

The lock 20 includes a housing 22 and a rod 24 that translates in the housing. In many environments, the housing is mounted to the seat frame (such as frame 7 in FIG. 5), a part of the seat that remains stationary relative to the seating surface. The seat frame can move forward and backward relative to the steering wheel and foot pedals as is well known. The rod connects to the seat part that moves, but these functions can be reversed.

One or two coil or clutch springs (two springs 26 and 28 are shown in FIG. 6) mount inside housing 22 and surround rod 24. Each spring has a normal inside diameter, when in its relaxed state, that is slightly less than the outside diameter of the rod. Therefore, the springs normally grip the rod tightly. Because the housing or internal bushings hold the springs securely and prevent the springs from moving longitudinally, the springs normally secure the rod longitudinally.

One end of each spring 26 and 28 attach to a lever 30. Part of lever 30 extends outside the housing (FIG. 6), and part of the lever acts as a bushing around the rod and inside the housing. When one moves the lever, the movement unwinds or uncoils the springs slightly. Unwinding increases the inside diameter of the springs enough to release the rod. When the lever is released, the coils of the springs rewind the springs to their locked diameter to grip the rod.

Mechanical locks have other configurations. For example, some use a threaded rod and a nut or end piece spinning on the rod. By controlling the rotation of the nut, one can limit translation of the rod. The rod also can remain stationary, and the nut can rotate and translate along the rod. One also can prevent an end piece or nut from rotating but can allow the rod to rotate and translate relative to the nut or end piece.

Housing 22 has a mounting hole 32, and the rod has a mounting hole 34 on flange 36 (FIG. 6). Bolts, spring pins, roll pins or other fasteners (not shown) through the mounting holes secure the housing and rod to the seat back frame arms or to the seat frame.

The mechanical lock shown in FIG. 6 also has a compression spring 38 that extends between a spring guide 40 attached to the housing and another flange 42 attached to the rod. The compression spring urges the rod to the right (FIG. 6), out of the housing. Assuming that the seat back reclines back as the rod moves into the housing, the compression spring compresses further. Therefore, when the user wants to pivot the seat back forward, the compression spring urges the seat back in that direction. That is useful because without spring force, the occupant would have to reach behind to grab the seat back. The compression spring also assists with dumping. Returning the dumped seat to an upright position compresses the spring so the return must be manual. However, the person entering the seat is usually in a convenient location to pivot the seat backwards.

Figure 1:
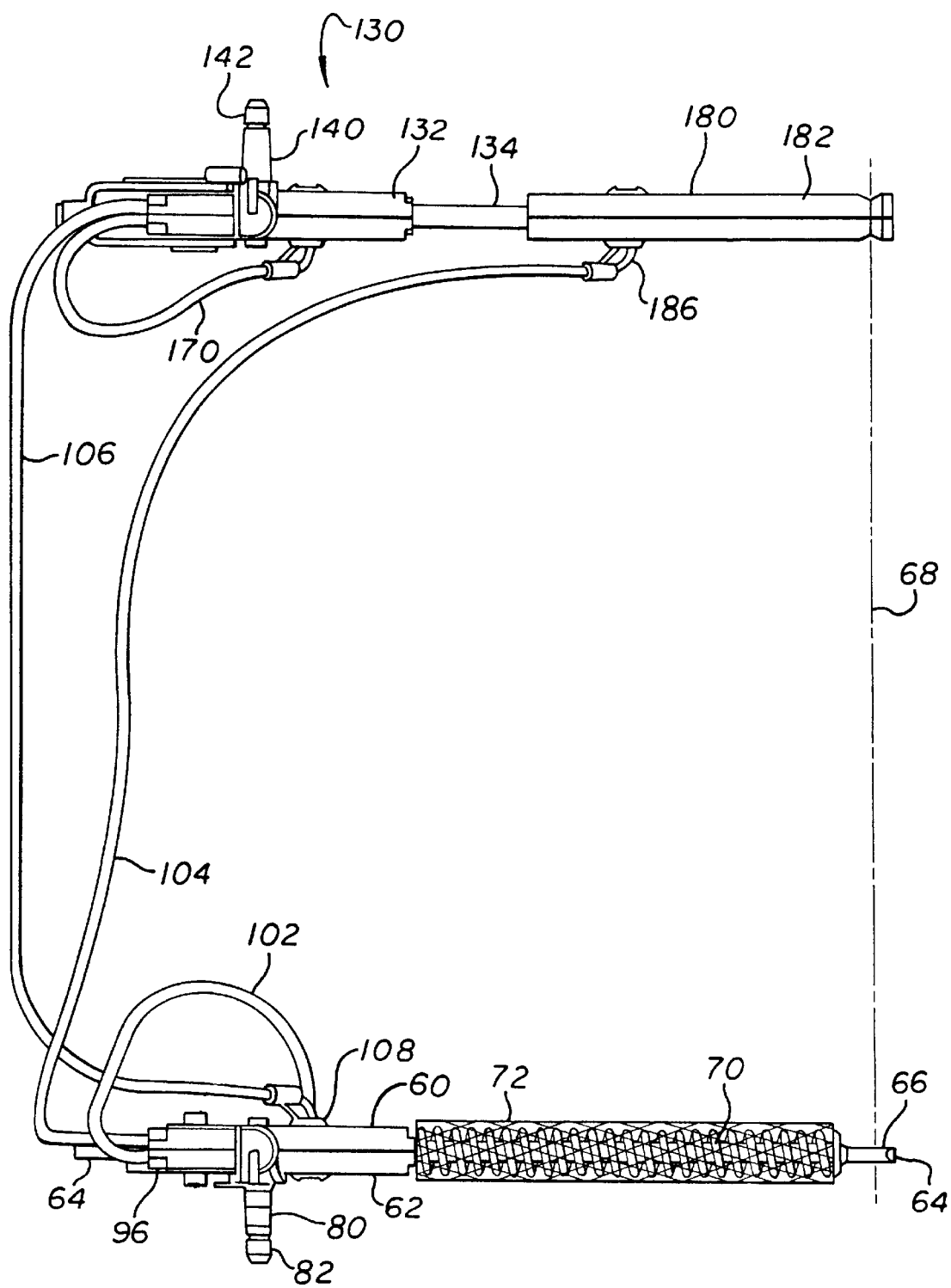
FIG. 1 is a plan view of an exemplary embodiment of the memory system for a seat back recliner of the present invention.

The mechanism for controlling reclining and dumping of a seat back of a seat of the present invention has three principal parts: a master recline mechanical lock 60, a dumping mechanical lock 130 and a slave recline mechanical lock 180 (FIG. 1).

For the discussion of FIG. 1, the size of mechanical locks 60, 130 and 180, the various parts associated with the locks, and their spacing and positioning depend on the seat, vehicle and other requirements. Thus, the drawing of the exemplary embodiment is representative of one configuration.

The master recline mechanical lock 60 (FIGS. 1 and 2) attaches between the seat frame and the seat back. The master recline mechanical lock of the exemplary embodiment comprising a housing 62 and a movable member 64 movable relative to the housing. In the exemplary embodiment, the movable member is a rod 64. The rod has a bore 66. A bolt or pin (not shown) attaches one arm of the seat back to the rod through the bore. Line 68 in FIG. 1 is the common line that the seat back arms attach to the system of the present invention. Part of the seat back frame, such as frame arm 8 in FIG. 5, attaches to the rod at line 68.

The housing 62 in the exemplary embodiment contains one or two coil or clutch springs (not shown in FIGS. 1, 2, 3 or 4) that surround rod 64. A compression spring 70, which extends between the housing and a flange on the rod, urges the rod to the right (FIG. 1). The exemplary embodiment also includes a plastic wire screen 72 surrounding spring 70 to prevent noise-generating metal-to-metal contact between the spring and the seat frame.

Figure 2:
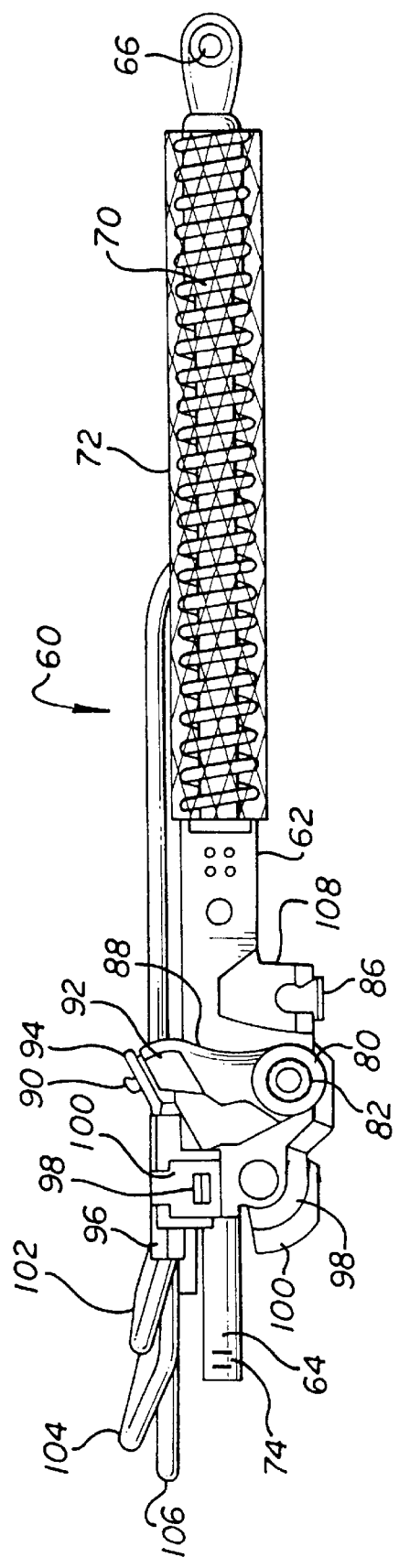
FIG. 2 is a side view of the master mechanical lock used in the exemplary embodiment of the present invention.

Spindle 80 attaches to housing 62 (FIGS. 1 and 2). The spindle has a series of grooves 82 to act as a spline for a handle (not shown). The handle, which usually is along the side of the seat, is the handle that the seat occupant moves to recline or otherwise adjust the seat back. FIG. 1 shows the driver side seat for a left-hand drive vehicle. The parts on the passenger side would be the mirror image. The handle is positioned so that the user adjusts the seat by rotating spindle 80 clockwise. Spindle 80 is part of a single piece that includes arm or lever 88 (FIG. 2). The lever is plastic, preferably a glass-filled nylon, which is strong and lightweight.

A cable 90 within a conduit 102 (FIG. 2) attaches to arm 88 between flanges 92 and 94. The cable assembly also attaches back to the housing at a fitting which is not visible in FIG. 2 but which is a mirror image of fitting 108, on the other side of the mechanical lock. As FIG. 2 shows, fitting 108 has an opening that can receive the cable assembly with conduit 102. The conduit attaches to the same kind of fitting on the opposite side of the lock. The cable within the conduit attaches to the lever 86 that extends within the housing (FIG. 2 and see springs 26 and 28 and lever 30 in FIG. 6). The lever rotates the coil springs sufficiently to uncoil the spring and release the rod 64 within the housing. Arm 88 also connects to a cable within conduits 104 and 102 (FIGS. 1 and 2). Conduit 104 connects to slave recline mechanical lock 180 (FIG. 1). In the exemplary embodiment, the cable within conduits 102 and 104 is the same, and the cable within conduits 106 and 170 is the same. Each of those conduit and cable combinations is part of a single (and separate) cable assembly. The cable within both conduits 102 and 104 (FIGS. 1 and 2), attaches to arm 88 (FIG. 2) by wrapping around and between fittings 92 and 94. Thus, clockwise rotation of arm 88 pulls the cable within conduits 102 and 104.

Once the internal coil springs release rod 64, the rod can translate within the housing (FIGS. 1 and 2). The translation normally would allow the seat back to pivot. Unless mechanical locks 130 or 180 are released, however, releasing or unlocking mechanical lock 60 does not result in pivoting of the seat back. Of course, if lock 60 is in a locked position, the rod cannot move irrespective of the condition of locks 130 or 180. Therefore, the seat back remains stationary.

Rod 64 also has short projecting ears 74 (FIG. 2). Before the mechanical lock is installed with the rod and housing attached to their appropriate vehicle parts, the installer could release the mechanical lock accidentally. Without anything holding rod 64, spring 70 could shoot the rod out of the housing, which could be dangerous. The ears 74 project outward sufficiently to engage the housing and prevent the rod from coming out of the housing. The ears also provide a mechanical stop for the forward-most seatback position.

To hold the cables in place, a cable block 96 fits over the ends of the conduits (FIGS. 1 and 2). The conduit block has flexible ears 98 that snap into openings on fitting 100 (FIG. 2). The fitting is part of the housing. This connection secures the cable block and the cable assemblies to the housing.

Figure 3:
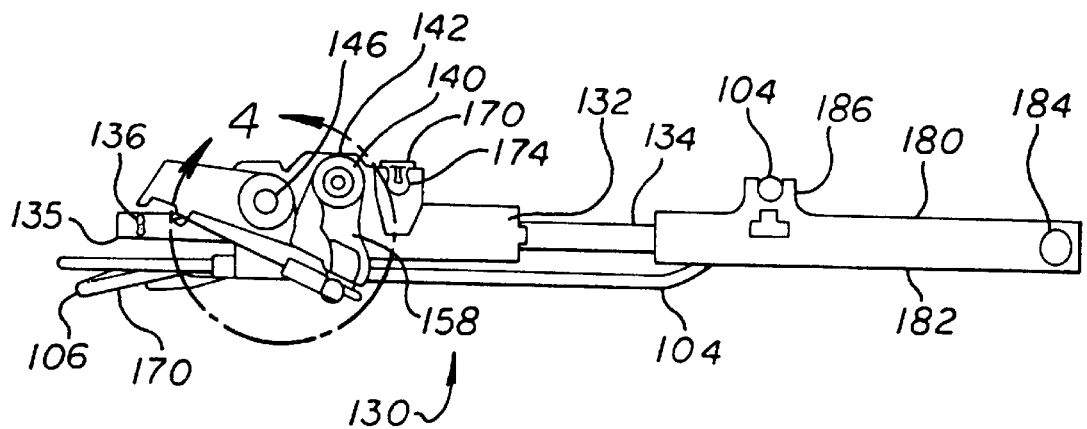
FIG. 3 is a side view of the dumping mechanical lock and the slave mechanical lock used in the exemplary embodiment of the present invention.

The exemplary embodiment of the memory system of the present invention also includes a dumping mechanical lock 130 (FIGS. 1 and 3). Lock 130 is similar to master mechanical lock 60 but is a mirror image with some differences. Lock 130 comprising a housing 132 and a movable member 134 movable relative to the housing. In the exemplary embodiment, the movable member is a rod 134. Whereas rod 64 of master mechanical lock 60 attaches to the seat back, the rod 134 that extends out of housing 132 also extends into housing 182 of slave mechanical lock 180. Consequently, mechanical locks 130 and 180 share rod 134. Instead of the rod 134 connecting to the seat back, housing 182 has a bore 184 (FIG. 3), which may include threads. Two bolts (not shown) attach an arm of the seat back frame to housing 182 along line 68 (FIG. 1). The frame arm attaches to a clamp, or clevis, (not shown) that attaches to the outside of housing 182, and the two bolts attach the clamp to the housing. Using a clamp and two bolts avoids having a bolt extend through the housing where it could block rod 134 from extending out of the right end of the housing (FIG. 1). Instead of a clamp, the frame arm can split into two portions adjacent to housing 182 to perform the equivalent function of a clamp. Another embodiment may allow the seat back to attach directly to the rod instead of the housing. Alternatively, a clamping device may allows the seat back to attach to only one side of the housing.

In the exemplary embodiment, the housing 132 of dumping mechanical lock 130 contains coil spring(s) around rod 134 (FIGS. 1 and 3). No compression spring (similar to spring 70 used with master mechanical lock 60) is used with mechanical locks 130 or 180. While one could use a compressing spring at various locations on or attached to parts of locks 130 or 180, spring 70 is sufficiently strong to provide enough force to pivot the seat back from its reclined positions.

Spindle 140 attaches to housing 130 (FIGS. 1 and 3). Grooves 142 on the spindle act as a spline for a handle (not shown). Many handles for dumping are located at the back of the seat in a reachable position for one entering or leaving the rear seat or for one stowing cargo behind the front seat. Depending on the design of the seat, a linkage, cable or other drive may be provided to connect the handle the user moves with the handle attached to spindle 140.

Figure 4:
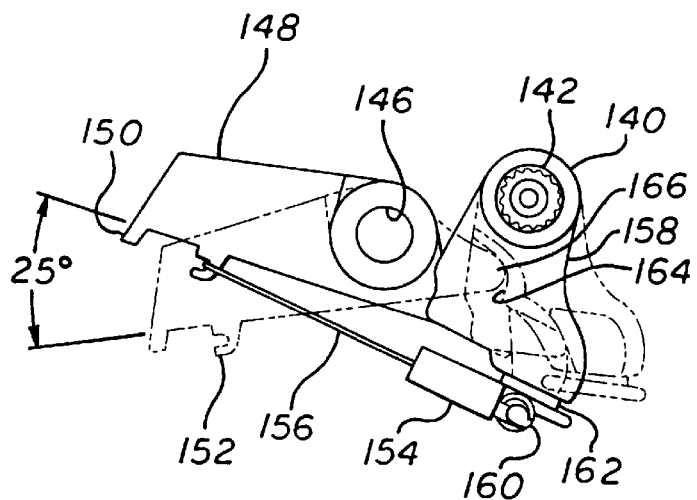
FIG. 4 is a detailed view of the latch mechanism used on the dumping mechanical look of the present invention.

The spindle 140 is part of arm 158 (FIGS. 3 and 4). Consequently, pivoting the spindle counterclockwise pivots arm 158 in the same direction. Cable 162 (FIGS. 1 and 4), which is common to conduits 170 and 106 (FIG. 1), attaches to the bottom end of arm 158 (FIG. 4). When arm 158 moves counterclockwise (FIG. 4), the cable within conduit 170 (FIGS. 1 and 3), moves a lever that extends into lock housing 132 to unwind the coil spring(s). An attachment on conduit 170 snaps into an opening that is similar to opening 174 (FIG. 3) on a fitting also similar to other-described fittings but from the far side of the housing 132. The fitting is part of the housing.

When arm 158 rotates counterclockwise, it pulls spring 154 to the right (FIG. 4). The spring attaches to a fitting 160, which is part of arm 158. A tang 156 of the spring attaches to fitting 152 on latch 148. The latch pivots around bore 146. The bore also acts as a mounting hole for a bolt or pin to attach housing 132 to the seat frame.

To dump the seat back, the user rotates, moves or lifts a handle to pivot spindle 140 and arm 158 counterclockwise. Through the lever's connection using the cable within conduit 170 to the lock's internal mechanism, the internal coil springs release rod 134 (FIGS. 1 and 3). Rotation of spindle 140 also pulls the cable within conduit 106. That cable attaches to the mechanism that uncoils the coil or clutch springs within master mechanical lock 60 (FIG. 1).

Consequently, during dumping, both mechanical locks 60 and 130 are unlocked and the respective rods can move longitudinally within the housings. On the other hand, slave lock 180 remains locked. Accordingly, as rod 134 translates, housing 182 also translates. Through the connection of housing 182 and rod 64 with the arms of the seat back, the seat back dumps.

Another embodiment includes a connection of both rods to the arms of the seat back, instead of one rod and one housing.

Returning to FIG. 4, the spring 154 pulls latch 148 into the position shown by phantom lines. In that position, nose 166 of latch 148 engages shoulder 164 of arm 158. In that position (also shown in phantom), arm 158 is held at its counterclock-wise position, which maintains cables 106 and 170 tight. Consequently, both mechanical locks 60 and 130 remain unlocked. As the seat back returns to its upright, adjusted position, the end 135 of rod 134 (FIG. 3) strikes leg 150 of latch 148 (FIG. 4) and causes the latch to snap back to the position shown by solid lines in FIG. 4. In the exemplary embodiment, latch 148 rotates 250. This rotation moves nose 166 on latch 148 out of engagement with shoulder 164 of arm 158. Consequently, the arm returns to its position shown in solid lines in FIG. 4. Force to return the arm to the solid line position comes from the spring 154. The lock's internal coil springs provide the force to return the lever to its locked position.

When arm 158 returns to that position, it also releases the coil springs within the master lock 60 through the connection 106 with cable 90 (FIG. 1). Thus, when dumping lock 130 locks, master lock 60 also locks.

Likewise, for reclining and seat back adjustment instead of dumping, locking and unlocking of the master and slave mechanical locks 60 and 180 must be coordinated. The slave recline mechanical lock 180 operates on the same principle as the other mechanical locks. It has a housing 182 but it shares rod 134 with dumping mechanical lock 130. One or two coil springs (not shown) within housing 182 grip the rod when lock 180 is locked and release the rod when the lock is unlocked.

For the slave lock 180 to pivot the seat back when it is unlocked, housing 182 slides along rod 134. Thus, unlike the other mechanical locks 60 and 130, which have their housings secured to the seat frame, housing 182 of slave lock 180 is attached to the seat back and moves relative to its rod 134.

When the master lock opens, the cable within conduit 104 (FIG. 1) opens slave lock 180. Conduit 104 attaches to the slave lock at fitting 186 (FIG. 1). Thus, opening the master lock 60 coordinates the opening of the slave lock 180.

Applicants contemplate switching the positions of slave lock 180 and dumping mechanical lock 130.

For one to adjust the seat back, he or she unlocks master lock 60 by rotating spindle 80 (FIGS. 1 and 2). That rotates arm 99 clockwise (FIG. 2) which simultaneously pulls the cables within conduit 102 and 104. The cables attach to the mechanisms that unwind the internal coil springs slightly to release the rod. Therefore, at the same time, rod 64 can translate within housing 62 of master lock 60, and housing 182 of slave lock 180 can translate along rod 134 (FIG. 1). Through the connection of rod 64 and housing 182 to the seat back, the position of the seat back can be adjusted.

When the user wants to adjust the seat back forward, compression spring 70 pivots the seat back in that direction. When the user wants to recline the seat, he or she can push back against the seat and against the force of compression spring 70.

After the seat back dumps and is returned to its upright position, it returns to the position of its previous adjustment. That is so because rod 134 has only a single locked position within housing 132. Once the rod returns to a position to release latch 148, lock 130 relocks. Any adjustment to the reclining position of the seat back takes place by releasing master lock 60 and slave lock 180. Those locks have variable positions in that their rods 64 and 134 respectively can be in any position within the housing when the housing is locked. Also, the mechanical locks have no hold-open device that would allow them to remain open.

Consequently, the user can choose a driving or sitting position by adjusting master and slave locks 60 and 180 and having that position maintained. When one dumps the seat back by opening dump lock 130, slave lock 180 does not unlock the rod. Therefore, when dump lock 130 relocks, the adjusted position for master and slave locks 60 and 180 are maintained.

While the specification describes particular embodiments of the present invention, persons of ordinary skill can devise variations of the present invention without departing from the inventive concept.

We claim:

1. A mechanism for controlling reclining and dumping of a seat back of a seat, the mechanism comprising:

a) a master mechanical lock attached between a seat frame and the seat back, the master mechanical lock comprising a housing and a recline movable member movable relative to the housing, the relative movement pivoting the seat back, the master mechanical lock having an unlocked condition permitting the relative movement of the housing and the recline movable member and a locked condition preventing the relative movement of the housing and the recline movable member;

b) a dumping mechanical lock attached between the seat frame and the seat back, the dumping mechanical lock comprising a housing and a dumping movable member, movable relative to the housing, the relative movement dumping the seat back, the dumping mechanical lock having an unlocked condition permitting the relative movement of the housing and the dumping movable member and a locked condition preventing the relative movement of the housing and the dumping movable member;

c) a slave recline mechanical lock comprising a housing, the dumping movable member, movably mounted within the housing of the slave recline mechanical lock, the slave recline mechanical lock having an unlocked condition permitting the relative movement of the housing and the dumping movable member and a locked condition preventing the relative movement of the housing and the dumping movable member;

d) a latch on the dumping mechanical lock having an unlatched position when the dumping movable member is in a fastened position and a latched position in which the dumping movable member can move relative to the housing of the dumping mechanical lock; and e) a connector extending between the latch and the master mechanical lock unlocking the master mechanical lock when the latch is latched.

2. The mechanism for controlling reclining and dumping a seat of claim 1 wherein at least one of the mechanical locks comprises a housing, the movable member for at least one of the mechanical locks comprises a rod, at least one of the mechanical locks having a coil spring fixed in the housing and surrounding the rod, the coil spring having normal inside diameter that is slightly less than the outside diameter of the rod, a release lever attached to the coil spring whereby movement of the release lever uncoils the spring to increase the inside diameter of the spring enough to release the rod.

3. The mechanism for controlling reclining and dumping a seat of claim 1 further comprising a second conduit extending between the master mechanical lock and the slave mechanical lock, the second cable unlocking the slave mechanical lock when the master mechanical lock is opened.

4. A mechanism for allowing pivoting and dumping of a seat back relative to a seat, the mechanism comprising a master mechanical lock and a dumping mechanical lock, each of the mechanical locks having a housing and a movable member translating relative to the housing, a locking mechanism in each of the housings for alternatively locking and unlocking the movable member associated with the housing, a slave mechanical lock on the movable member of the dumping mechanical lock, the slave mechanical lock having a locking mechanism for alternatively locking and unlocking the movable member associated with the dumping mechanical lock, whereby when the locking mechanism of the slave mechanical lock is unlocked, the position of the dumping mechanical lock and the slave mechanical lock can adjust relative to each other, and wherein the movable member in the master mechanical lock is a rod, the rod being attached to the seat back, the housing of the slave lock being attached to the seat back.

5. The mechanism of claim 4 further comprising a connection between the master mechanical lock and the dumping mechanical lock, the connection maintaining the master mechanical lock unlocked when the dumping mechanical lock is unlocked.

6. The mechanism of claim 5 further comprising a latch on the dumping mechanical lock having a latched and an unlatched position, the locking mechanism moving the latch to the latched position when the locking mechanism unlocks the dumping mechanical lock, the locking mechanism preventing the latch from returning to the unlatched position, the latch being positioned in the path of the movable member of the dumping mechanical lock to move the latch to the unlatched position.

7. The mechanism of claim 6 wherein the latch in the latched position maintains the connection between the master mechanical lock and the dumping mechanical lock in a condition preventing the master mechanical lock from locking.

8. The mechanism of claim 5 further comprising a second connection attached to the master mechanical lock and the slave mechanical lock and permitting the dumping mechanical lock and the slave mechanical lock to adjust relative to each other when the master mechanical lock is unlocked.

\* \* \* \* \*